US007008893B2

(12) United States Patent
Yoshimura (10) Patent No.: US 7,008,893 B2
(45) Date of Patent: Mar. 7, 2006

(54) SILICON NITRIDE-BASED COMPOSITE SINTERED BODY AND PRODUCING METHOD THEREOF

(75) Inventor: Masashi Yoshimura, Itami (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 11/031,994

(22) Filed: Jan. 11, 2005

(65) Prior Publication Data

US 2005/0164865 A1 Jul. 28, 2005

Related U.S. Application Data

(62) Division of application No. 10/311,604, filed as application No. PCT/JP02/03864 on Apr. 18, 2002, now Pat. No. 6,844,282.

(30) Foreign Application Priority Data

| Apr. 20, 2001 | (JP) | ............................ 2001-121905 |
| Jul. 24, 2001 | (JP) | ............................ 2001-222812 |
| Jul. 24, 2001 | (JP) | ............................ 2001-222813 |
| Jul. 24, 2001 | (JP) | ............................ 2001-222814 |

(51) Int. Cl.
*C04B 35/00* (2006.01)
(52) U.S. Cl. ................... 501/96.4; 501/97.1; 501/97.4; 501/96.3
(58) Field of Classification Search ............... 501/96.4, 501/97.1, 97.2, 97.3, 97.4, 96.1, 96.3
See application file for complete search history.

(56) References Cited

U.S. PATENT DOCUMENTS 5,352,641 A 10/1994 Matsui et al.
5,369,065 A 11/1994 Yoshimura et al.
5,384,292 A 1/1995 Matsui et al.

(Continued)

FOREIGN PATENT DOCUMENTS

JP 2-160669 6/1990

(Continued)

*Primary Examiner*—Karl Group
(74) *Attorney, Agent, or Firm*—McDermott Will & Emery LLP (57) ABSTRACT

The present invention provides a silicon nitride-based sintered body having excellent mechanical properties from room temperature to a medium-low temperature range, a low friction coefficient and excellent wear resistance; a raw material powder for the sintered body; a method of producing the raw material powder; and a method of producing the sintered body.

The sintered body of the present invention comprises silicon nitride, titanium compounds and boron nitride, or else silicon nitride, a titanium-based nitride and/or carbide, silicon carbide and graphite and/or carbon; and it has a mean particle diameter of 100 nm or less, and a friction coefficient under lubricant-free conditions of 0.3 or less, or else 0.2 or less. The silicon nitride-based composite powder, which is the raw material of the sintered body comprises primary particles of each of silicon nitride and titanium compounds, containing boron or carbon, each having a mean particle diameter of 20 nm or less, or 30 nm or less, and a phase containing an amorphous phase that surrounds the surfaces of the primary particles. Moreover, the method of producing the sintered body comprises pulverizing and mixing a silicon nitride powder, a sintering aid powder, a metallic titanium powder and a boron nitride powder, or else a silicon nitride powder, a sintering aid powder, a metallic titanium powder and a graphite and/or carbon powder, until the mean particle diameters become 20 nm or less, or else 30 nm or less, thus forming secondary

4 Claims, 1 Drawing Sheet

100nm

U.S. PATENT DOCUMENTS

5,908,796 A    6/1999   Pujari et al.

FOREIGN PATENT DOCUMENTS

| JP | 6-183841   | 7/1994  |
| -- | ---------- | ------- |
| JP | 6-345540   | 12/1994 |
| JP | 7-133157   | 5/1995  |
| JP | 7-330421   | 12/1995 |
| JP | 11-43372   | 2/1999  |
| JP | 11-139874  | 5/1999  |
| JP | 11-139875  | 5/1999  |
| JP | 11-139876  | 5/1999  |
| JP | 11-139882  | 5/1999  |
| JP | 2000-34173 | 2/2000  |
| JP | 2000-144394 | * 5/2000 |

* cited by examiner

SILICON NITRIDE-BASED COMPOSITE SINTERED BODY AND PRODUCING METHOD THEREOF

This application is a divisional of application Ser. No. 10/311,604 filed Dec. 18, 2002, which is a 371 of PCT/JP02/03864, filed Apr. 18, 2002, now U.S. Pat. No. 6,844,282.

TECHNICAL FIELD

The present invention relates to a silicon nitride-based sintered body having a low friction coefficient and excellent mechanical properties from room temperature to a medium-low temperature range. This sintered body is a high-wear-resistance and low-friction structural ceramic material for use in various mechanical parts, cutting tools, sliding parts and so on. The present invention also relates to a method of producing the sintered body, a raw material composite powder for the sintered body and a method of producing the raw material composite powder.

BACKGROUND ART

Silicon nitride ($Si_3N_4$) is an excellent material in terms of strength, toughness, corrosion resistance, oxidation resistance and thermal shock resistance, and is thus widely used in cutting tools, gas turbines, bearings and so on. Using silicon nitride for a structural material such as engine components has recently been researched, and more wear resistance, hardness and so on are required more severely for silicon nitride in their level of performance.

For example, in the case that a silicon nitride-based composite material is used in tools for deformation or specific automobile components for which high wear resistance is required, a markedly higher wear resistance is required than with a conventional material such as a hard metal (a cermet material comprising hard particles made of WC and a binding phase of Co or the like) or high-speed steel.

However, silicon nitride-based composite materials are more expensive than the above materials, and the current situation is that the wear resistance is not at a satisfactory level commensurate with the cost.

Note that 'silicon nitride-based' refers to ceramics containing silicon nitride ($Si_3N_4$) and/or sialon as a main crystalline phase. Moreover, 'silicon nitride-based composite material' refers to a material comprising a matrix having a silicon nitride-based ceramic as main crystals thereof, and a different component dispersed and composited in the matrix.

Various researches have been carried out to further improve the properties of such silicon nitride-based materials. For example, in Japanese Patent Publications No. 11-139882 and No. 11-139874, it was reported that by mixing together a silicon nitride powder and a metallic titanium powder at high acceleration in a nitrogen atmosphere, a composite powder comprising fine silicon nitride particles and titanium nitride particles can be obtained. Furthermore, it was also reported that by using this composite powder, a silicon nitride sintered body having a fine crystalline structure and a high strength can be produced because the titanium nitride particles suppress the grain growth of the silicon nitride.

Although the above silicon nitride sintered body exhibits a high strength, research had still not been proceeded into the properties relating to friction as a material for machine structural use, in particular into reducing the friction under lubricant-free conditions, which is most promising with regard to the current trend towards energy-saving.

Moving on, as a common method to produce a ceramic material having a low friction coefficient, a method in which a solid lubricant such as boron nitride, molybdenum sulfide or graphite is dispersed in the material is well known. However, regarding the second phase of the solid lubricant, dispersion is only possible down to about submicron size, and hence there has been a limit to how much the friction coefficient can be reduced.

Moreover, in Japanese Patent Publication No. 11-43372, a silicon nitride-based ceramic was proposed and the ceramic contains 0.5 to 50 wt % of free carbon, for which the mean minor axis diameter of the silicon nitride-based crystal grains is 0.5 µm or less, and the ceramic also has a friction coefficient under lubricant-free conditions of 0.2 or less. However, with such a combination of silicon nitride and free carbon, the comparative wear amount is low at $10^{-7}$ $mm^2/N$, and hence problems still remain with regard to the wear amount.

DISCLOSURE OF THE INVENTION

In view of the current state as described above, it is an object of the present invention to provide a silicon nitride-based sintered body having excellent mechanical properties from room temperature to a medium-low temperature range, and also having a low friction coefficient and excellent wear resistance, along with a method of producing the sintered body, a composite powder suitable for producing the sintered body, and a method of producing the composite powder.

1. Silicon Nitride-Based Composite Powder Containing Boron

A first aspect of the present invention provides a silicon nitride-based composite powder, which is a powder of secondary composite particles comprising primary particles of each of silicon nitride, titanium nitride, titanium boride and boron nitride each having a mean particle diameter of 20 nm or less, and a phase containing at least an amorphous phase that surrounds surfaces of the primary particles, wherein a mean particle diameter of the secondary composite particles is 0.3 µm or more. This composite powder can be used as a raw material of a silicon nitride-based composite sintered body.

In this silicon nitride-based composite powder containing boron of the present invention, because the powder comprises fine silicon nitride ($Si_3N_4$) particles with of mean particle diameter 20 nm or less and includes dispersed particles that are titanium nitride (TiN), boron nitride (BN) and titanium boride ($TiB_2$) with of mean particle diameter 20 nm or less, grain growth of the $Si_3N_4$ and the dispersed particles themselves during sintering can be suppressed. Furthermore, because the boron nitride is dispersed extremely finely and uniformly in the silicon nitride-based composite powder, a silicon nitride-based sintered body is able to have a low friction coefficient and excellent wear resistance.

The fine particles of each of silicon nitride, titanium nitride, boron nitride and titanium boride having a mean particle diameter of 20 nm or less aggregate together to form the composite powder, and furthermore the surface of the composite powder is surrounded predominantly by an amorphous metal of silicon and/or titanium. Thereby, surface oxidation can be suppressed more than with a conventional non-oxide-based powder that is a nanometer size, and thus handling is easy. Moreover, the mean particle diameter of the composite powder, i.e. the aggregate, is about 0.3 to 1.0 μm, therefore the composite powder can be treated as with conventional commercially sold powders.

The secondary composite particles have an internal structure in which $Si_3N_4$ and titanium compounds of particle diameter a few nm to a few tens of nm are dispersed respectively and uniformly. Actually, from the results of EDX and electron diffraction, it was found that a nanocomposite structure is formed such that these nanometer-size $Si_3N_4$ and titanium compound particles are surrounded predominantly by amorphous titanium.

As will be described later, mixing at high acceleration is needed in order to obtain the silicon nitride-based composite powder of the present invention. It is accepted that the metallic titanium brings about specific mechanochemical reactions, making the boron nitride and silicon nitride particles fine during the mixing.

A silicon nitride-based composite sintered body produced using the above silicon nitride-based composite powder of the present invention has a crystalline structure in which the $Si_3N_4$, TiN, $TiB_2$ and BN are controlled to have a fine particle diameter. And hence, the strength of the sintered body is high from room temperature to a medium-low temperature range, and the friction coefficient is low and the wear resistance is very high because the boron nitride is dispersed extremely finely and uniformly.

When manufacturing a sintered body, a sintering aid is added to the powder to be sintered, and it is desirable for this sintering aid to be dispersed uniformly in the powder for sintering. Consequently, in the present invention, to uniformly disperse such a sintering aid in the raw material powder for the sintered body, it is also preferable to add the sintering aid together with the raw material powder of the silicon nitride-based composite powder, at the stage of manufacturing the sintered body. In the examples which will be described later, examples are shown in which a sintering aid was added to the raw materials of the silicon nitride-based composite powder when manufacturing this composite powder. However, the present invention also encompasses the case that the sintering aid is not added at the stage of manufacturing the composite powder, but rather is added to the powder to be sintered.

2. Silicon Nitride-Based Composite Powder Containing Carbon

A second aspect of the present invention provides a silicon nitride-based composite powder, which is a powder of secondary composite particles comprising primary particles of each of silicon nitride, titanium compound, and graphite and/or carbon each having a mean particle diameter of 30 nm or less, and a phase containing an amorphous phase that surrounds surfaces of the primary particles. In this case, the phase containing an amorphous phase comprises titanium, silicon, and carbon in places. Moreover, 'titanium compound' here means at least one of titanium nitride, titanium carbonitride and titanium carbide.

In this silicon nitride-based composite powder of the present invention, primary particles of silicon nitride, titanium compound, and graphite and/or carbon each having a mean particle diameter of 30 nm or less aggregate together to form a composite powder. Further, the surfaces of the composite powder are surrounded by an amorphous metal of titanium and/or silicon, and in places amorphous carbon. Consequently, surface oxidation can be suppressed more than with a usual non-oxide-based powder that is nanometer size, and thus handling is easy. The mean particle diameter of the secondary composite particle powder, i.e. the aggregate, is about 0.3 to 1.0 μm, and hence the secondary composite particle powder can be handled as with conventional commercially sold powders.

To prepare the composite powder of the present invention, the raw materials are mixed at high acceleration, whereby it is theorized that the metallic titanium and the graphite bring about specific mechanochemical reactions, making the silicon nitride particles fine. In addition, titanium carbonitride is produced in places.

A silicon nitride-based composite sintered body manufactured using the above silicon nitride-based composite powder has a crystalline structure in which the $Si_3N_4$, titanium compounds, SiC and C are controlled to have a fine particle diameter, and hence the friction coefficient is low and the wear resistance is very high.

When manufacturing a sintered body, a sintering aid is added to the powder to be sintering, and it is desirable for this sintering aid to be dispersed uniformly in the powder. Consequently, in the present invention, to uniformly disperse such a sintering aid in the raw material powder for the sintered body, it is preferable to add the sintering aid together with the raw material powder, i.e. the silicon nitride-based composite powder, at the stage of manufacturing the sintered body. In the examples which will be described later, samples are shown in which a sintering aid was added to the raw materials of the silicon nitride-based composite powder when manufacturing this composite powder, but the present invention also encompasses the case that the sintering aid is not added at the stage of manufacturing the composite powder, but rather is added to the powder to be sintered.

3. Silicon Nitride-Based Composite Sintered Body Containing Boron

A third aspect of the present invention provides a silicon nitride-based composite sintered body, comprising silicon nitride, titanium compounds and boron nitride, and having a mean particle diameter of 100 nm or less and a friction coefficient under a lubricant-free condition of 0.3 or less.

The 'titanium compounds' here are predominantly titanium nitride and titanium boride. The mean particle diameter of the sintered body must be 100 nm or less. If the mean particle diameter exceeds 100 nm, then particle dropout and adhesion during friction will severely increase, and hence the friction coefficient will worsen. The mean particle diameter is preferably 50 nm or less, although this depends on the sintering conditions of the material (the density).

Figure 1:
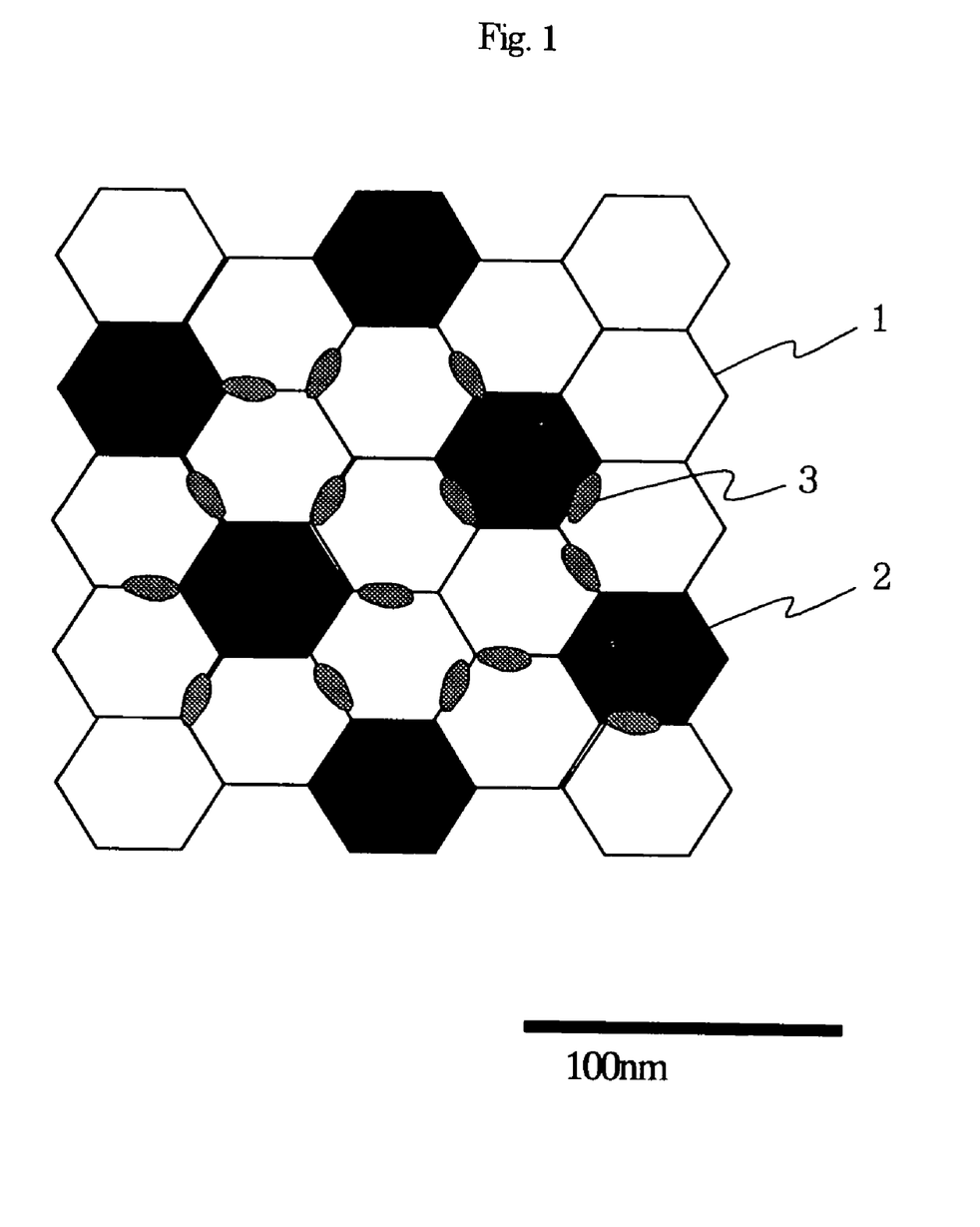
FIG. 1 is a drawing showing schematically a TEM image of the silicon nitride-based composite sintered body of the present invention.

FIG. 1 is a drawing showing schematically a transmission electron microscope (TEM) image of the silicon nitride-based composite sintered body containing boron of the present invention. The sintered body is obtained using a producing method that will be described later, and has a nanostructure comprising uniform particles of mean particle diameter 100 nm or less. Furthermore, from the results of X-ray analysis and EDX analysis, it was found that metallic titanium has changed into titanium nitride and titanium boride, the titanium nitride particles suppress grain growth of the $Si_3N_4$ and thus make the structure fine, the titanium boride takes on a columnar or planar form and is dispersed at the grain boundary and/or inside the titanium nitride particles, and the BN is dispersed at a triple point and the grain boundary of the silicon nitride 1 and the titanium compounds 2. This BN is shown as number 3 in the TEM image of FIG. 1.

In the sintered body of the present invention, it is preferable for some of the titanium boride to be planar or columnar with aminor axis diameter of 20 nm or less and an aspect ratio of 3 or more. Through the formation of such columnar particles, the mechanical properties of the composite sintered body can be improved.

Due to the specific nanostructure described above, the sintered body of the present invention is a silicon nitride-based composite sintered body having excellent mechanical properties, with the strength being 500 MPa or more, and the fracture toughness being 6 MPa.m$^{1/2}$ or more. The sintered body also exhibits high wear resistance and its friction coefficient is low, with the friction coefficient for friction against $Si_3N_4$ being 0.3 or less, and the comparative wear amount being as low as $2.0 \times 10^{-8}$ mm$^2$/N.

4. Silicon Nitride-Based Composite Sintered Body Containing Carbon

A fourth aspect of the present invention provides a silicon nitride-based composite sintered body, comprising silicon nitride, titanium-based nitride and/or titanium-based carbide, silicon carbide, and graphite or carbon, and having a mean particle diameter of 100 nm or less and a friction coefficient under a lubricant-free condition of 0.2 or less.

As a raw material powder for this sintered body of the present invention, a powder of secondary composite particle is used. This secondary composite particle comprises primary particles of mean particle diameter 30 nm or less that has been formed by mixing and pulverizing silicon nitride, nitride and/or carbide of titanium, and graphite powder or carbon powder. The secondary composite particles are sintered at from 1200 to 1600° C. in a nitrogen atmosphere using spark plasma sintering or the like.

This silicon nitride composite sintered body of the present invention has a nanostructure comprising uniform particles of mean particle diameter 100 nm or less, more preferably 50 nm or less. Such a mean particle diameter is required to realize the material properties aimed for with the sintered body of the present invention. The metallic titanium all changes to titanium nitride and titanium carbide or titanium carbonitride during the sintering. The TiN suppresses grain growth of the silicon nitride ($Si_3N_4$) and thus makes the structure fine, and carbon is dispersed at points where the silicon nitride ($Si_3N_4$), the titanium nitride (TiN) and the titanium carbide (TiC) or titanium carbonitride (TiCN) overlap and at grain boundaries. Moreover, some of the carbon may become silicon carbide.

Due to the specific nanostructure described above, the sintered body of the present invention is a silicon nitride-based composite sintered body having excellent wear properties. The sintered body of the present invention is excellent not only in the case of two such sintered bodies rubbing against one another but also when used with a metal such as steel. The sintered body has a low friction coefficient, with the friction coefficient being 0.2 or less and the comparative wear amount being $1.0 \times 10^{-8}$ mm$^2$/N or less, and hence wear resistance is excellent. Reasons for the low wear are regarded that carbon, which is a solid lubricant, is dispersed finely, and moreover titanium compounds, which are not prone to adhering to steel, are dispersed with the particle size being of nanometer order.

5. Method of Producing Silicon Nitride-Based Composite Powder Containing Boron A fifth aspect of the present invention provides a method of producing a silicon nitride-based composite powder, comprising mixing and pulverizing a silicon nitride powder, a boron nitride powder and a metallic titanium powder at an acceleration from 10 to 300 G and a temperature from room temperature to 250° C. in a nitrogen atmosphere.

It is theorized that by mixing at a high acceleration from 10 to 300 G, the metallic titanium brings about predominantly the mechanochemical reactions of the chemical formulae shown below, making each of the boron nitride and the silicon nitride into fine particles having a mean primary particle diameter of 20 nm or less.

$2BN+Ti \rightarrow TiB_2+N_2$ $Si_3N_4+4Ti \rightarrow 4TiN+3Si$ $2Ti+N_2 \rightarrow 2TiN$ The amount added of the boron nitride powder needs at least 2 wt % to obtain sufficiently low friction properties. Whereas, not more than 40 wt % is appropriate to maintain the excellent mechanical properties of the material. A range of from 2 to 40 wt % is thus preferable though there are no particular limitations.

There are no particular limitations on the amount added of the metallic titanium powder, but a range of from 5 to 60 wt % is preferable. In the case that the amount added of the metallic titanium powder is less than 5 wt %, the amount of titanium reacting will be too low, and hence the processes will not make the boron nitride and the silicon nitride fine. On the other hand, if the amount added exceeds 60 wt %, then undesirable mottling and so on of the sintered body will occur because of the larger amount of titanium.

All of the raw material powders in the present invention may be commercially sold ones. The crystalline form of the $Si_3N_4$ powder may be α or β.

Reasons for the limit to the acceleration within 10 to 300 G are that at less than 10 G it will be difficult to make the powder fine and uniform, and hence the crystal grain diameter in the final sintered body will not be uniform; whereas if the acceleration during the mixing exceeds 300 G, then impurities will get into the powder through wear of the pot or balls in a pulverizing machine. The mixing means is preferably to use a ball mill or an attritor that can also pulverize.

The temperature during the mixing at high acceleration is from room temperature to 250° C., preferably from 50° C. to 200° C. In this temperature range, the above-mentioned mechanochemical reactions are promoted, and hence the aimed composite powder based on a powder having the mean primary particle diameter of 30 nm or less can be obtained in a short time. Regarding the mixing time, the making into fine particles that accompanies the reactions will not proceed at less than 0.5 hours, whereas impurities will get into the powder at more than 50 hours. It is thus preferable to set the mixing time from 0.5 to 50 hours. Note that it is preferable to control the acceleration, the temperature and the mixing time during the mixing as appropriate in accordance with the requirements of the powder to be produced.

A nitrogen atmosphere is required to bring about the mechanochemical reactions described above. The pressure of this nitrogen atmosphere is preferably in a range of 0.05 to 1.0 MPa, more preferably 0.08 to 0.15 MPa. If the pressure of the nitrogen atmosphere is less than 0.05 MPa, then control will be difficult. Whereas, if this pressure exceeds 1.0 MPa, then a special vessel such as a pressure-withstanding vessel will be required, which is undesirable.

It has been found that, by pulverizing and mixing as described above, the mechanochemical reactions from metallic titanium to titanium compounds occur during the processes, and the crystal grain diameter of the $Si_3N_4$ becomes lower as the mixing time increases. Ultimately, the secondary composite particles of mean particle diameter of 0.3 μm or more are formed.

A silicon nitride-based composite sintered body manufactured using the silicon nitride-based composite powder described above has a crystalline structure in which the $Si_3N_4$, TiN, $TiB_2$ and BN are controlled to have a fine particle diameter. The strength is thus high from room temperature to a medium-low temperature range, and moreover the friction coefficient is low and the wear resistance is very high, because the boron nitride is dispersed extremely finely and uniformly.

6. Method of Producing Silicon Nitride-Based Composite Powder Containing Carbon

A sixth aspect of the present invention provides a method of producing a silicon nitride-based composite powder, comprising mixing and pulverizing a silicon nitride powder, a metallic titanium powder, and a graphite and/or carbon powder at an acceleration from 10 to 300 G and a temperature from room temperature to 250° C. in a nitrogen atmosphere. It is also effective to add the graphite and/or carbon not as a powder but rather as a phenol resin or the like.

It is theorized that by mixing at a high acceleration from 10 to 300 G, the metallic titanium brings about predominantly the mechanochemical reactions of the chemical formulae shown below, making each of silicon nitride, titanium nitride, titanium carbide and titanium carbonitride into fine particles having a mean particle diameter of 30 nm or less.

$Si_3N_4 + 4Ti \rightarrow 4TiN + 3Si$ $2Ti + N_2 \rightarrow 2TiN$ $Ti + C \rightarrow TiC$ In this case, the titanium nitride and the titanium carbide usually undergo solid solution with one another, thus forming titanium carbonitride.

It is preferable for the amount added of the graphite and/or carbon to be from 0.5 to 20 wt %. In the case that the amount added of the graphite and/or carbon is less than 0.5 wt %, the sintered body will not obtain sufficient friction properties. In addition to that, because the powder attaches to the walls of the vessel during the mixing, the amount of such attachment will increase and hence the percentage of the powder gathered will drop in that case. On the other hand, if the amount added of the graphite and/or carbon exceeds 20 wt %, then the graphite and/or carbon will not become dense when the sintered body is made, and hence the material properties will worsen.

Although there are no particular limitations on the amount added of the metallic titanium powder, a range of from 5 to 60 wt % is preferable. In the case that the amount added of the metallic titanium powder is less than 5 wt %, since the amount of titanium reacting will be too low, the silicon nitride will not be fine. On the other hand, if the amount added exceeds 60 wt %, undesirable mottling and so on of the sintered body will occur, because the amount of titanium reacting will become too high.

All of the raw material powders in the present invention may be commercially sold ones. The crystalline form of the $Si_3N_4$ powder may be α or β.

Reasons for the limit to the acceleration within 10 to 300 G are that at less than 10 G it will be difficult to make the powder fine and uniform, and hence the crystal grain diameter in the final sintered body will not be uniform. Whereas, if the acceleration during the mixing exceeds 300 G, then impurities will get into the powder through wear of the pot or balls in a pulverizing machine. As the mixing means, it is preferable to use a ball mill or an attritor that can also pulverizes.

The temperature during the mixing at high acceleration is from room temperature to 250° C., preferably from 50° C. to 200° C. In this temperature range, the above-mentioned mechanochemical reactions are promoted, and hence the aimed composite powder based on a powder having the mean primary particle diameter of 30 nm or less can be obtained in a short time. Regarding the mixing time, the making into fine particles that accompanies the reactions will not proceed at less than 0.5 hours, whereas impurities will get into the powder at more than 50 hours. It is thus preferable to set the mixing time from 0.5 to 50 hours. Note that it is preferable to control the acceleration, the temperature and the mixing time during the mixing as appropriate in accordance with the requirements of the powder to be produced.

A nitrogen atmosphere is required to bring about the mechanochemical reactions described above. The pressure of this nitrogen atmosphere is preferably in a range of 0.05 to 1.0 MPa, more preferably 0.08 to 0.15 MPa. If the pressure of the nitrogen atmosphere is less than 0.05 MPa, then control will be difficult. Whereas, if this pressure exceeds 1.0 MPa, then a special vessel such as a pressure-withstanding vessel will be required, which is undesirable.

It has been found that, by pulverizing and mixing as described above, the mechanochemical reactions from metallic titanium to titanium compounds occur during the processes, and the crystal grain diameter of the $Si_3N_4$ becomes lower as the mixing time increases. Ultimately, the secondary composite particles of mean particle diameter of 0.3 μm or more, and a phase containing an amorphous phase that surrounds the surfaces of the particles, are formed.

A silicon nitride-based composite sintered body obtained using the silicon nitride-based composite powder produced as described above has a crystalline structure in which the $Si_3N_4$, titanium compounds, SiC and C are controlled to have a fine particle diameter, and hence the friction coefficient is low and the wear resistance is very high.

7. Method of Producing Silicon Nitride-Based Composite Sintered Body Containing Boron A seventh aspect of the present invention provides a method of producing a silicon nitride-based composite sintered body, comprising pulverizing and mixing a silicon nitride powder, a sintering aid powder, a metallic titanium powder and a boron nitride powder until mean particle diameters become 20 nm or less as primary particles, forming secondary composite particles, molding the secondary composite particles to form a compact, and sintering the compact under a nitrogen atmosphere at from 1200 to 1600° C.

As a raw material powder, it is preferable to manufacture the silicon nitride-based composite powder of the present invention. That is, powders of silicon nitride, a sintering aid, metallic titanium and boron nitride are mixed together at an acceleration from 10 to 300 G and a temperature from room temperature to 250° C. in a nitrogen atmosphere of pressure from 0.05 to 1.0 MPa. As a result, each kind of the powders becomes primary particles having a mean particle diameter of 20 nm or less, and the composite powder becomes secondary composite particles having a phase containing an amorphous phase on the surfaces of the primary particles with a mean particle diameter of 0.3 μm or more, including a thickness of the surface phase.

All of the raw material powders used in the producing method of the present invention may be commercially sold ones. The crystalline form of the $Si_3N_4$ powder may be α or β. $Y_2O_3$, $Al_2O_3$ and so on can be used as the sintering aid.

At least 2 wt % of boron nitride is necessary to obtain sufficiently low friction properties, whereas, not more than 40 wt % is appropriate for maintaining the excellent mechanical properties of the material. Although there are no particular limitations on the amount added of the boron nitride powder, a range of from 2 to 40 wt % is thus preferable.

There are no particular limitations on the amount added of the metallic titanium powder, but a range of from 5 to 60 wt % is preferable. In the case that the amount added of the metallic titanium powder is less than 5 wt %, since the amount of titanium reacting will be too low, it will not make the boron nitride and the silicon nitride fine. On the other hand, if the amount added exceeds 60 wt %, undesirable mottling and so on of the sintered body will occur owing to the large amount of titanium, which is involved the reaction.

It is theorized that by mixing at a high acceleration from 10 to 300 G, the metallic titanium brings about predominantly the mechanochemical reactions of the chemical formulae shown below, making each of the boron nitride and the silicon nitride into fine particles having a mean primary particle diameter of 20 nm or less.

$$2BN+Ti \rightarrow TiB_2+N_2$$

$$Si_3N_4+4Ti \rightarrow 4TiN+3Si$$

$$2Ti+N_2 \rightarrow 2TiN$$

Reasons for the limit to the acceleration within 10 to 300 G are following: at less than 10 G it will be difficult to make the powder fine and uniform, and hence the crystal grain diameter in the final sintered body will not be uniform; whereas if the acceleration during the mixing exceeds 300 G, then impurities will get into the powder through wear of the pot or balls in a pulverizing machine. As the mixing means, it is preferable to use a ball mill or an attritor that can also pulverize.

The temperature during the mixing at high acceleration is from room temperature to 250° C., preferably from 50° C. to 200° C. In this temperature range, the above-mentioned mechanochemical reactions are promoted, and hence the aimed composite powder based on a powder having the mean primary particle diameter of 30 nm or less can be obtained in a short time. Regarding the mixing time, the making into fine particles that accompanies the reactions will not proceed at less than 0.5 hours, whereas impurities will get into the powder at more than 50 hours. It is thus preferable to set the mixing time from 0.5 to 50 hours. Note that it is preferable to control the acceleration, the temperature and the mixing time during the mixing as appropriate in accordance with the requirements of the powder to be produced.

A nitrogen atmosphere is required to bring about the mechanochemical reactions described above. The pressure of this nitrogen atmosphere is preferably in a range of 0.05 to 1.0 MPa, more preferably 0.08 to 0.15 MPa. If the pressure of the nitrogen atmosphere is less than 0.05 MPa, then control will be difficult. Whereas, if this pressure exceeds 1.0 MPa, then a special vessel such as a pressure-withstanding vessel will be required, which is undesirable.

It has been found that, by pulverizing and mixing as described above, the mechanochemical reactions from metallic titanium to titanium compounds occur during the processes, and the crystal grain diameter of the $Si_3N_4$ becomes lower as the mixing time increases. Ultimately, the secondary composite particles of mean particle diameter down to 0.3 μm are formed.

The secondary composite particles have an internal structure in which $Si_3N_4$ and titanium compounds of particle diameter a few nm to a few tens of nm are dispersed uniformly. Actually, from the results of EDX and electron diffraction, it was found that a nanocomposite structure is formed in which these nanometer-size $Si_3N_4$ and titanium compound particles are surrounded predominantly by amorphous titanium.

After the secondary composite particles have been formed as described above, the compact of these is sintered under a nitrogen atmosphere at from 1200 to 1600° C. It is known that grain growth occurs in which crystal grains join together due to the heat during the sintering. In order to suppress such grain growth accompanying the heating as much as possible, it is effective to adopt a method such as a sintering under a high pressure and a sintering at a low temperature for a short time. Accordingly, it is effective as the sintering method to use microwave sintering or spark plasma sintering for which electric current sintering is possible.

According to the producing method described above, the novel silicon nitride-based composite sintered body of the present invention having a characteristic nanostructure can be obtained.

8. Method of Producing Silicon Nitride-Based Composite Sintered Body Containing Carbon There is provided a method of producing a silicon nitride-based composite sintered body, comprising pulverizing and mixing a silicon nitride powder, a sintering aid powder, a metallic titanium powder, and a graphite and/or carbon powder until mean particle diameters become 30 nm or less as primary particles, forming secondary composite particles, molding the secondary composite particles to form a compact, and sintering the compact under a nitrogen atmosphere at from 1200 to 1600° C. To realize the material properties of the sintered body of the present invention, the mean particle diameter should be 100 nm or less, preferably 50 nm or less.

To produce the sintered body of the present invention, it is preferable to manufacture the silicon nitride-based composite powder of the present invention as a raw material powder. That is, powders of silicon nitride, a sintering aid, metallic titanium, and graphite and/or carbon are mixed together at an acceleration from 10 to 300 G and a temperature from room temperature to 250° C. in a nitrogen atmosphere of pressure from 0.05 to 1.0 MPa. As a result, as described earlier, each of the powders becomes primary particles having a mean particle diameter of 30 nm or less, and the primary particles form the secondary composite particles having a phase containing an amorphous phase on the surfaces of the primary particles.

All of the raw material powders used in the producing method of the present invention may be commercially sold ones. The crystalline form of the $Si_3N_4$ powder may be α or β. $Y_2O_3$, $Al_2O_3$ and so on can be used as the sintering aid.

Although there are no particular limitations on the amount added of the metallic titanium powder, a range of from 5 to 60 wt % is preferable. If the amount added of the metallic titanium powder is less than 5 wt %, the silicon nitride will not be made fine because the amount of titanium reacting is too low. On the other hand, if the amount added exceeds 60 wt %, then undesirable mottling and so on of the sintered body will occur because the amount of titanium reacting is too high.

When adding graphite and/or carbon powder, from 0.5 to 20 wt % is preferable. If the amount of carbon exceeds 20 wt %, then abrasive wear will severely increase, and hence the wear resistance will drop. On the other hand, if the amount of carbon is less than 0.5 wt %, then the friction coefficient will increase due to insufficient carbon, which is a solid lubricant.

It is theorized that by the mixing at a high acceleration from 10 to 300 G, the metallic titanium brings about predominantly the mechanochemical reactions of the chemical formulae shown below, making each of silicon nitride, titanium nitride, titanium carbide and titanium carbonitride into fine particles having a mean particle diameter of 30 nm or less.

$$Si_3N_4 + 4Ti \rightarrow 4TiN + 3Si$$

$$2Ti + N_2 \rightarrow 2TiN$$

$$Ti + C \rightarrow TiC$$

In this case, the titanium nitride and the titanium carbide usually undergo solid solution with one another, thus forming titanium carbonitride.

Reasons for the limit to the acceleration within 10 to 300 G are following: at less than 10 G it will be difficult to make the powder fine and uniform, and hence the crystal grain diameter in the final sintered body will not be uniform; whereas if the acceleration during the mixing exceeds 300 G, then impurities will get into the powder through wear of the pot or balls in a pulverizing machine. As the mixing means, it is preferable to use a ball mill or an attritor that can also pulverize.

The temperature during the mixing at high acceleration is from room temperature to 250° C., preferably from 50° C. to 200° C. In this temperature range, the above-mentioned mechanochemical reactions are promoted, and hence the aimed composite powder based on a powder having the mean primary particle diameter of 30 nm or less can be obtained in a short time. Regarding the mixing time, the making into fine particles that accompanies the reactions will not proceed at less than 0.5 hours, whereas impurities will get into the powder at more than 50 hours. It is thus preferable to set the mixing time from 0.5 to 50 hours. Note that it is preferable to control the acceleration, the temperature and the mixing time during the mixing as appropriate in accordance with the requirements of the powder to be produced.

A nitrogen atmosphere is required to bring about the mechanochemical reactions described above. The pressure of this nitrogen atmosphere is preferably in a range of 0.05 to 1.0 MPa, more preferably 0.08 to 0.15 MPa. If the pressure of the nitrogen atmosphere is less than 0.05 MPa, then control will be difficult. Whereas, if this pressure exceeds 1.0 MPa, then a special vessel such as a pressure-withstanding vessel will be required, which is undesirable.

It has been found that, by pulverizing and mixing as described above, mechanochemical reactions from metallic titanium to titanium compounds occur during the processes, and the crystal grain diameter of the $Si_3N_4$ becomes lower as the mixing time increases. Ultimately, the secondary composite particles of mean particle diameter down to 0.3 μm, and a phase containing an amorphous phase that surrounds the surfaces of the particles, are formed.

After the secondary composite particles have been formed as described above, the compact of these is sintered under a nitrogen atmosphere at from 1200 to 1600° C. It is known that grain growth occurs in which crystal grains join together due to the heat during the sintering. In order to suppress such grain growth accompanying the heating as much as possible, it is effective to adopt a method such as a sintering under a high pressure and a sintering at a low temperature for a short time. Accordingly, it is effective to use microwave sintering or spark plasma sintering for which electric current sintering is possible as the sintering method.

According to the producing method described above, the novel silicon nitride-based composite sintered body of the present invention having a characteristic nanostructure as described earlier can be obtained.

BEST MODE FOR CARRYING OUT THE INVENTION

Following is a detailed description of the present invention through examples and comparative examples.

EXAMPLE 1

2.5 wt % of a $Y_2O_3$ powder and 1 wt % of an $Al_2O_3$ powder were added as a sintering aid to a commercially sold $Si_3N_4$ powder having a mean particle diameter of 0.5 μm, and then 40 wt % of a metallic titanium powder of mean particle diameter 10 μm and 10 wt % of a BN powder of mean particle diameter 5 μm were added. The powders were mixed for 16 hours at an acceleration of 150 G using a planetary ball mill with $Si_3N_4$ balls at a temperature of 50° C. in a 0.1 MPa nitrogen atmosphere, thus obtaining the silicon nitride-based composite powder of the present invention.

The powder obtained was subjected to qualitative analysis using XRD, whereupon peaks corresponding to each of $Si_3N_4$, TiN, $TiB_2$ and BN were identified. Moreover, the composite powder was observed using a transmission electron microscope, whereupon it was found that the mean particle diameter was 20 nm or less for all of the $Si_3N_4$ particles, the TiN particles, the $TiB_2$ particles and the BN particles, and that the structure was such that these particles were surrounded by amorphous Ti and Si. The mean particle diameter of the composite powder obtained was 0.5 μm.

The composite powder was filled into a carbon die, and then sintered at 1300° C. using spark plasma sintering (SPS). The sintered body obtained was subjected to grinding and lapping, and then the wear resistance properties were evaluated using a ball-on-disk tester. The result was that the sintered body obtained exhibited a low friction coefficient of 0.2, and a high wear resistance, with the comparative wear amount being $2.0 \times 10^{-8}$ mm²/N. The sintered body was polished, and then a film test piece was produced by Ar ion etching. The particle diameters of the $Si_3N_4$, TiN, BN and $TiB_2$ in the test piece were then evaluated using a transmission electron microscope, whereupon it was found that each of these types of particle was extremely fine, with the particle diameter being 50 nm or less.

COMPARATIVE EXAMPLE 1

As a comparison, a composite powder was produced by the same manner as in Example 1 above, except that the raw material powder was mixed using ultrasonic wave instead of the planetary ball mill, and then this composite powder was sintered as in Example 1 above. The ultrasonic wave mixing was used as a conventional mixing method, and its acceleration level was insufficient to pulverize the ceramic powders. TiN particles and BN particles of size several μm were observed in the sintered body obtained in this comparative example, and moreover the friction coefficient was high at about 0.5, and the comparative wear amount was $7.0 \times 10^{-7}$ mm$^2$/N.

EXAMPLES 2-1 TO 2-12

The same sintering aid as in Example 1 was added to a commercially sold $Si_3N_4$ powder having a mean particle diameter of 0.5 μm, and then a metallic titanium powder of mean particle diameter 10 μm and a BN powder of mean particle diameter 5 μm were added in the amounts shown in Table 1 below.

The raw material powder of each of the samples in Table 1 below was then mixed using a planetary ball mill as in Example 1, but using mixing conditions as shown in Table 2 below with regard to the atmosphere, the pressure, the temperature, the acceleration and the mixing time, thus obtaining silicon nitride-based composite powders.

Next, for each of the composite powders obtained, the mean particle diameter of each of the $Si_3N_4$ particles, the TiN particles, the BN particles and the $TiB_2$ particles was determined as in Example 1. The results are shown in Table 3 below.

COMPARATIVE EXAMPLES 2-1 TO 2-4

Silicon nitride-based composite powders were produced as in Examples 2, only using samples and conditions as indicated by '*' in Tables 1 and 2 below. For each of the composite powders obtained, the mean particle diameter of each of the $Si_3N_4$ particles, the TiN particles, the BN particles and the $TiB_2$ particles was determined as in Examples 2. The results are shown in Table 3 below along with those for Examples 2.

TABLE 1

| Sample | Amount of Ti added (wt %) | Amount of BN added (wt %) |
|---|---|---|
| 1* | — | 20 |
| 2* | 5 | — |
| 3 | 5 | 20 |
| 4 | 5 | 40 |
| 5 | 20 | 10 |
| 6 | 20 | 30 |
| 7 | 20 | 10 |
| 8 | 20 | 30 |
| 9 | 60 | 10 |
| 10 | 60 | 30 |

Note:
Samples marked '*' in the table are samples of Comparative Examples 2.

TABLE 2

| Conditions | Atmosphere | Pressure (MPa) | Temperature (° C.) | Acceleration (G) | Time (hr) |
|---|---|---|---|---|---|
| A | $N_2$ | 0.1 | 50 | 150 | 25 |
| B | $N_2$ | 0.1 | Room temperature | 300 | 5 |
| C* | $N_2$ | 0.1 | 50 | 5 | 50 |
| D | $N_2$ | 0.05 | 50 | 10 | 50 |
| E | $N_2$ | 0.1 | 200 | 300 | 0.5 |
| F | $N_2$ | 0.5 | 50 | 150 | 25 |
| G* | Ar | 0.1 | 50 | 150 | 25 |

Note:
Conditions marked '*' in the table are conditions for Comparative Examples 2.

TABLE 3

| | | Mean particle diameter (nm) | | | |
|---|---|---|---|---|---|
| Sample | Conditions | $Si_3N_4$ | BN | TiN | $TiB_2$ |
| Example | | | | | |
| 2-1 | 3 | A | 20 | 20 | 10 | 10 |
| 2-2 | 3 | B | 18 | 15 | 11 | 12 |
| 2-3 | 3 | D | 20 | 20 | 20 | 15 |
| 2-4 | 3 | E | 18 | 18 | 15 | 15 |
| 2-5 | 3 | F | 16 | 16 | 8 | 8 |
| 2-6 | 4 | A | 20 | 20 | 10 | 15 |
| 2-7 | 5 | A | 15 | 15 | 6 | 8 |
| 2-8 | 6 | A | 15 | 17 | 6 | 8 |
| 2-9 | 7 | A | 10 | 10 | 5 | 5 |
| 2-10 | 8 | A | 10 | 10 | 5 | 8 |
| 2-11 | 9 | A | 10 | 9 | 6 | 8 |
| 2-12 | 10 | A | 10 | 6 | 9 | 12 |
| Comparative | | | | | | |
| Example | Sample | Conditions | $Si_3N_4$ | BN | TiN | $TiB_2$ |
| 2-1 | 1* | A | 400 | 2000 | — | — |
| 2-2 | 2* | A | 100 | — | 1000 | — |
| 2-3 | 3 | C* | 400 | 1000 | 600 | 300 |
| 2-4 | 3 | G* | 50 | 100 | 90 | 90 |

From Table 3, it is concluded that by suitably selecting the amounts added of the metallic titanium powder and the BN powder, and the mixing conditions, i.e. the atmosphere, the pressure, the temperature, the acceleration and the mixing time, within the ranges defined in the present invention, a composite powder comprising fine particles can be obtained. Moreover, even in the case of using a mixing apparatus other than a planetary ball mill, for example an attritor, if the raw material powder was mixed at an acceleration from 10 to 300 G, then the same results was obtained virtually.

EXAMPLE 3

2.5 wt % of a $Y_2O_3$ powder and 1 wt % of an $Al_2O_3$ powder were added as a sintering aid to a commercially sold $Si_3N_4$ powder having a mean particle diameter of 0.5 μm, and then 40 wt % of a metallic titanium powder of mean particle diameter 10 μm and 5 wt % of a graphite powder of mean particle diameter 5 μm were added. The powders were mixed for 16 hours at an acceleration of 150 G using a planetary ball mill with $Si_3N_4$ balls at a temperature of 50° C. in a 0.1 MPa nitrogen atmosphere, thus obtaining the silicon nitride-based composite powder of the present invention.

The composite powder obtained was subjected to qualitative analysis using XRD, whereupon broad peaks corresponding to $Si_3N_4$, TiN, TiC (TiCN) and C were identified. Moreover, the composite powder was observed using a transmission electron microscope, whereupon it was found that the mean particle diameter was 30 nm or less for all of the constituent particles, and that the structure was such that these particles were surrounded by amorphous titanium and silicon, and in places carbon. The mean particle diameter of the composite powder obtained was 0.3 μm.

Next, a sintered body was produced using the silicon nitride-based composite powder. The composite powder was filled into a carbon die, and then the powder was sintered at 1400° C. with a heating rate of 100° C./min and a holding time of 5 min, using spark plasma sintering. The sintered body obtained was subjected to grinding and lapping, and then the wear resistance properties were evaluated using a ball-on-disk tester. The result was that the sintered body obtained exhibited a low friction coefficient of 0.12, and a high wear resistance, with the comparative wear amount being $5 \times 10^{-9}$ mm$^2$/N. Moreover, the sintered body was polished, and then a film test piece was produced by Ar ion etching. The test piece was evaluated using a transmission electron microscope, whereupon it was found that extremely fine particles of 50 nm or less had been formed.

COMPARATIVE EXAMPLE 3

As a comparison, a composite powder was produced by the same manner as in Example 1 above, except that the raw material powder was mixed using ultrasonic wave instead of the planetary ball mill. Then, this composite powder was sintered as in Example 1 above. The ultrasonic wave mixing was used as a conventional mixing method, and its acceleration level was insufficient for pulverizing the ceramic powders. TiCN particles of size several μm were observed in the sintered body obtained in Comparative Example 1, and moreover the friction coefficient was high at about 0.5, and the wear resistance was low, with the comparative wear amount being $5.0 \times 10^{-8}$ mm$^2$/N.

EXAMPLES 4-1 TO 4-11

The same sintering aid as in Example 3 was added to an Si$_3$N$_4$ powder having a mean particle diameter of 0.5 μm, and then a metallic titanium powder of mean particle diameter 10 μm and a graphite powder of mean particle diameter 5 μm were added in the amounts shown in Table 4 below. The silicon nitride-based composite powders of the present invention, i.e. the secondary composite particles, were then obtained by the same steps as in Example 3, but with the atmosphere, the temperature, the acceleration and the time as shown in Table 5 below. For each of the composite powders obtained, qualitative analysis was then carried out using XRD, whereupon it was found that the mean particle diameters for the Si$_3$N$_4$, the titanium compounds (TiN, TiC, and TiCN) and the C were as shown in Table 6 below.

COMPARATIVE EXAMPLES 4-1 TO 4-5

Composite powders were obtained by the same manner as in Examples 4, only using samples as indicated in Table 4 below and conditions as indicated in Table 5 below. For each of the composite powders obtained, qualitative analysis was then performed using XRD, whereupon it was found that the mean particle diameters for the Si$_3$N$_4$, the titanium compounds (TiN, TiC, and TiCN) and the C were as shown in Table 6 below.

TABLE 4

| Sample | Amount of Ti added (wt %) | Amount of C added (wt %) |
|---|---|---|
| 4-1* | — | 10 |
| 4-2* | 5 | — |

TABLE 4-continued

| Sample | Amount of Ti added (wt %) | Amount of C added (wt %) |
|---|---|---|
| 4-3 | 5 | 10 |
| 4-4 | 5 | 20 |
| 4-5 | 15 | 2 |
| 4-6 | 15 | 15 |
| 4-7 | 15 | 5 |
| 4-8 | 15 | 15 |
| 4-9 | 50 | 5 |
| 4-10 | 50 | 10 |

Note:
Samples marked '*' in the table are samples of Comparative Examples 4.

TABLE 5

| Conditions | Atmosphere | Pressure (MPa) | Temperature (° C.) | Acceleration (G) | Time (hr) |
|---|---|---|---|---|---|
| 4-A | N$_2$ | 0.1 | 50 | 75 | 15 |
| 4-B | N$_2$ | 0.1 | Room temperature | 150 | 3 |
| 4-C* | N$_2$ | 0.1 | 50 | 2 | 20 |
| 4-D* | N$_2$ | 0.05 | 50 | 5 | 20 |
| 4-E | N$_2$ | 0.1 | 200 | 150 | 0.5 |
| 4-F | N$_2$ | 0.5 | 50 | 50 | 15 |
| 4-G* | Ar | 0.1 | 50 | 50 | 15 |

Note:
Conditions marked '*' in the table are conditions for Comparative Examples 4.

TABLE 6

| Sample | Conditions | Si$_3$N$_4$ particle diameter (nm) | C particle diameter (nm) | Ti compound particle diameter (nm) |
|---|---|---|---|---|
| Example | | | | |
| 4-1 | 4-3 | 4-A | 30 | 10 | 15 |
| 4-2 | 4-3 | 4-B | 25 | 10 | 15 |
| 4-3 | 4-3 | 4-E | 25 | 8 | 16 |
| 4-4 | 4-3 | 4-F | 20 | 10 | 15 |
| 4-5 | 4-4 | 4-A | 30 | 12 | 20 |
| 4-6 | 4-5 | 4-A | 25 | 9 | 16 |
| 4-7 | 4-6 | 4-A | 25 | 10 | 10 |
| 4-8 | 4-7 | 4-A | 20 | 10 | 15 |
| 4-9 | 4-8 | 4-A | 20 | 10 | 15 |
| 4-10 | 4-9 | 4-A | 20 | 7 | 15 |
| 4-11 | 4-10 | 4-A | 20 | 15 | 18 |
| Comp. Ex. | | | | |
| 4-1 | 4-1* | 4-A | 500 | 2000 | — |
| 4-2 | 4-2* | 4-A | 100 | — | 1000 |
| 4-3 | 4-3 | 4-C* | 550 | 1000 | 1200 |
| 4-4 | 4-3 | 4-D* | 50 | 20 | 40 |
| 4-5 | 4-3 | 4-G* | 500 | 150 | 200 |

EXAMPLES 5-1 TO 5-3

2.5 wt % of a Y$_2$O$_3$ powder and 1 wt % of an Al$_2$O$_3$ powder were added as a sintering aid to a commercially sold Si$_3$N$_4$ powder having a mean particle diameter of 0.5 μm, and then 30 wt % of a metallic titanium powder of mean particle diameter 10 μm and 10 wt % of a BN powder of mean particle diameter 5 μm were added. The powders were mixed for 16 hours at an acceleration of 150 G using a planetary ball mill with Si$_3$N$_4$ balls at a temperature of 50°

C. in a 0.1 MPa nitrogen atmosphere, thus obtaining the silicon nitride-based composite powder of the present invention.

The powder obtained was subjected to qualitative analysis using XRD, whereupon peaks corresponding to $Si_3N_4$, TiN, $TiB_2$ and BN were identified. The composite powder was observed using a transmission electron microscope, whereupon it was found that the mean particle diameter was 20 nm or less for all of the particles, and that the structure was such that the particles were surrounded by amorphous titanium and silicon. The composite powder obtained, i.e. the secondary composite particles, had a mean particle diameter of 0.5 μm.

The composite powder was filled into a carbon die and then sintered using a spark plasma sintering machine capable of electric current sintering under the conditions shown in Table 7 below with a heating rate of 100° C./min and a holding time of 5 min, thus obtaining the silicon nitride-based composite sintered bodies of the present invention. The temperature was measured at the carbon die.

Each of the sintered bodies obtained was subjected to grinding and lapping, and then the composition was evaluated using XRD. In addition, measurements were performed using a ball-on-disk tester with an $Si_3N_4$ ball of diameter 5 mm under a lubricant-free condition (25° C., normal atmosphere, humidity 60%) at 0.1 m/s, thus evaluating the friction coefficient and the comparative wear amount. Furthermore, each sintered body was polished, a film test piece was produced by Ar ion etching, and the particle diameters were evaluated using a transmission electron microscope. The results of the above are all shown in Table 8.

With regard to the sintered body obtained in Example 5-2 in particular, the fracture strength was measured in accordance with JIS R 1601, whereupon an average strength of 750 MPa was exhibited. Furthermore, the fracture toughness ($K_{IC}$) was measured in accordance with JIS R 1607, whereupon a value of 6.5 MPa.m$^{1/2}$ was obtained.

COMPARATIVE EXAMPLES 5-1 AND 5-2

As Comparative Examples 5, after obtaining a composite powder by the same way as in Examples 5, the composite powder was sintered as in Example 5, only under the conditions shown as 5-A* or 5-E* in Table 7 below. Tests were then carried out as in Example 5 and the results are again shown in Table 8 below.

TABLE 7

|  | Sintering temperature (° C.) |
|---|---|
| 5-A* | 1100 |
| 5-B | 1200 |
| 5-C | 1400 |
| 5-D | 1600 |
| 5-E* | 1700 |

*indicates conditions for Comparative Examples 5

TABLE 8

|  | Conditions | Friction coefficient | Comparative wear amount (×10$^{-8}$ mm$^2$/N) | $Si_3N_4$ particle diameter (nm) | TiN particle diameter (nm) | $TiB_2$ particle diameter (nm) | BN particle diameter (nm) |
|---|---|---|---|---|---|---|---|
| Ex. |  |  |  |  |  |  |  |
| 5-1 | 5-B | 0.3 | 3 | 30 | 18 | 16 | 5 |
| 5-2 | 5-C | 0.2 | 0.6 | 40 | 40 | 30 | 5 |
| 5-3 | 5-D | 0.25 | 5 | 80 | 90 | 50 | 10 |
| Comp. Ex. |  |  |  |  |  |  |  |
| 5-1 | 5-A* | 0.4 | 10 | 20 | 15 | 15 | 5 |
| 5-2 | 5-E* | 0.6 | 7 | 200 | 250 | 100 | 30 |

EXAMPLES 6-1 TO 6-7

A metallic titanium powder of mean particle diameter 10 μm and a BN powder of mean particle diameter 5 μm were added, as in Examples 5 but in the amounts shown in Table 9 below, to an $Si_3N_4$ powder of mean particle diameter 0.5 μm to which 2.5 wt % of $Y_2O_3$ and 1 wt % of $Al_2O_3$ had been added as a sintering aid. Then, the powders were mixed for 16 hours using a planetary ball mill with $Si_3N_4$ balls under conditions of an acceleration of 150 G, a temperature of 50° C., and a 0.1 MPa nitrogen atmosphere, thus obtaining the silicon nitride-based composite powders of the present invention.

Each composite powder obtained was sintered using a spark plasma sintering machine capable of electric current sintering as in Examples 5 but under the conditions shown in Table 9 below, thus obtaining the silicon nitride-based composite sintered bodies of the present invention. The sintered bodies obtained were evaluated using the same techniques as in Examples 5. The results are shown in Table 10 below.

COMPARATIVE EXAMPLES 6-1 TO 6-3

As Comparative Examples 6, composite powders were obtained as in Examples 6 but using the mixes shown in Table 9 below, and then each composite powder was sintered as in Examples 6 but under the conditions shown in Table 9. Tests were then carried out as in Examples 6 and the results are again shown in Table 10 below.

TABLE 9

|  | $Si_3N_4$ (wt %) | Ti (wt %) | BN (wt %) | Sintering temperature (° C.) |
|---|---|---|---|---|
| Example |  |  |  |  |
| 6-1 | 93 | 5 | 2 | 1450 |
| 6-2 | 70 | 10 | 20 | 1450 |
| 6-3 | 68 | 30 | 2 | 1400 |

TABLE 9-continued

|  | $Si_3N_4$ (wt %) | Ti (wt %) | BN (wt %) | Sintering temperature (° C.) |
|---|---|---|---|---|
| 6-4 | 60 | 30 | 10 | 1400 |
| 6-5 | 30 | 30 | 40 | 1400 |
| 6-6 | 30 | 50 | 20 | 1350 |
| 6-7 | 20 | 60 | 20 | 1300 |
| Comparative Example | | | | |
| 6-1 | 98 | 0 | 2 | 1450 |
| 6-2 | 20 | 30 | 50 | 1400 |
| 6-3 | 10 | 70 | 20 | 1300 |

TABLE 10

|  | Friction coefficient | Comparative wear amount ($\times 10^{-8}$ mm$^2$/N) | $Si_3N_4$ particle diameter (nm) | TiN particle diameter (nm) | $TiB_2$ particle diameter (nm) | BN particle diameter (nm) |
|---|---|---|---|---|---|---|
| Ex. | | | | | | |
| 6-1 | 0.3 | 3 | 90 | 60 | 60 | 10 |
| 6-2 | 0.25 | 0.6 | 30 | 30 | 30 | 10 |
| 6-3 | 0.3 | 5 | 80 | 90 | 50 | 10 |
| 6-4 | 0.2 | 0.6 | 40 | 40 | 30 | 5 |
| 6-5 | 0.2 | 0.8 | 50 | 50 | 50 | 30 |
| 6-6 | 0.3 | 1 | 40 | 40 | 40 | 5 |
| 6-7 | 0.25 | 1 | 30 | 30 | 30 | 5 |
| Comp. Ex. | | | | | | |
| 6-1 | 0.6 | 10 | 300 | — | — | 300 |
| 6-2 | 0.4 | 15 | 50 | 80 | 80 | 120 |
| 6-3 | 0.45 | 20 | 30 | 150 | 100 | 5 |

EXAMPLES 7-1 TO 7-3

2.5 wt % of a $Y_2O_3$ powder and 1 wt % of an $Al_2O_3$ powder were added as a sintering aid to a commercially sold $Si_3N_4$ powder having a mean particle diameter of 0.5 µm, and then 30 wt % of a metallic titanium powder of mean particle diameter 10 µm and 5 wt % of a carbon powder of mean particle diameter 5 µm were added. The powders were mixed for 16 hours at an acceleration of 150 G using a planetary ball mill with $Si_3N_4$ balls at a temperature of 50° C. in a 0.1 MPa nitrogen atmosphere, thus obtaining the silicon nitride-based composite powder of the present invention.

The powder obtained was subjected to qualitative analysis using XRD, whereupon peaks corresponding to $Si_3N_4$, TiN, TiCN and C were identified. The composite powder was observed using a transmission electron microscope, whereupon it was found that the mean particle diameter was 30 nm or less for all of the particles, and that the structure was such that the particles were surrounded by a phase containing an amorphous phase. The mean diameter of the secondary composite particles of the composite powder was 0.5 µm.

The composite powder was filled into a carbon die, and then the powder was sintered using a spark plasma sintering machine capable of electric current sintering under the conditions shown in Table 11 below, with a heating rate of 100° C./min and a holding time of 5 min. Thus, the silicon nitride-based composite sintered bodies of the present invention were obtained. The temperature was measured on the carbon die using a two-color thermometer.

Each of the sintered bodies obtained was subjected to grinding and lapping, and then the composition was evaluated using XRD. In addition, the wear resistance properties were evaluated using a ball-on-disk tester with a $Si_3N_4$ ball of diameter 5 mm under a lubricant-free condition (25° C., normal atmosphere, humidity 60%) with a sliding distance of 1000 m at 0.2 m/s and 10N. The friction coefficient and the comparative wear amount were thus evaluated. Furthermore, each sintered body was polished, and then a film test piece was produced by Ar ion etching, and the mean particle diameters were evaluated using a transmission electron microscope. The results of the above evaluations are all shown in Table 12.

With regard to the sintered body produced in Example 7-3 in particular, a wear resistance test using an SUJ2 ball of diameter 5 mm instead of an $Si_3N_4$ ball in the above was carried out. The result was that a friction coefficient of 0.1 was exhibited. The comparative wear amount was $0.4 \times 10^{-8}$ mm$^2$/N. Furthermore, other wear resistance tests were also performed with an $Si_3N_4$ ball at from 0.1 to 2.0 m/s and a sliding distance of 1000 m, under conditions of 20, 40 and 80N. The results were that a friction coefficient and a comparative wear amount about the same as in the 10N case were obtained.

COMPARATIVE EXAMPLES 7-1 AND 7-2

As Comparative Examples 7, sintered bodies were obtained as in Examples 7, only using conditions as in Table 11 below, and then tests were performed as in Examples 7. The results are again shown in Table 12 below.

TABLE 11

|  | Sintering temperature (° C.) |
|---|---|
| 7-A* | 1100 |
| 7-B | 1200 |
| 7-C | 1400 |
| 7-D | 1600 |
| 7-E* | 1700 |

*indicates conditions for Comparative Examples 7

TABLE 12

|  | Conditions | Friction coefficient | Comparative wear amount ($\times 10^{-8}$ mm$^2$/N) | Particle diameter (nm) |
|---|---|---|---|---|
| Example |  |  |  |  |
| 7-1 | 7-B | 0.15 | 0.5 | 30 |
| 7-2 | 7-C | 0.1 | 0.3 | 40 |
| 7-3 | 7-D | 0.2 | 2 | 90 |
| Comparative Example |  |  |  |  |
| 7-1 | 7-A* | 0.6 | 6 | 20 |
| 7-2 | 7-E* | 0.6 | 3 | 180 |

EXAMPLES 8-1 TO 8-7

Metallic titanium of mean particle diameter 10 μm and a carbon powder of mean particle diameter 5 μm were added, as in Examples 7 but in the amounts shown in Table 13, to an Si$_3$N$_4$ powder of mean particle diameter 0.5 μm to which 2.5 wt % of Y$_2$O$_3$ and 1 wt % of Al$_2$O$_3$ had been added as a sintering aid. The powders were mixed for 16 hours using a planetary ball mill with Si$_3$N$_4$ balls under conditions of an acceleration of 150 G, a temperature of 50° C., and a 0.1 MPa nitrogen atmosphere, thus obtaining the silicon nitride-based composite powders.

Each composite powder obtained was sintered using spark plasma sintering for which electric current sintering was possible as in Examples 7, but under the conditions shown in Table 13 below, thus obtaining the silicon nitride-based composite sintered bodies of the present invention. The sintered bodies obtained were evaluated using the same techniques as in Examples 7. The results are shown in Table 14 below.

COMPARATIVE EXAMPLE 8

A composite powder was produced as in Examples 8, only using the mix shown in Table 13 below. The powder was sintered and then the sintered body obtained was evaluated as in Examples 8. The evaluation results are again shown in Table 14 below.

TABLE 13

|  | Si$_3$N$_4$ (wt %) | Ti (wt %) | C (wt %) | Sintering temperature (C.) |
|---|---|---|---|---|
| Example |  |  |  |  |
| 8-1 | 93 | 5 | 2 | 1450 |
| 8-2 | 70 | 10 | 20 | 1450 |
| 8-3 | 69.5 | 30 | 0.5 | 1400 |
| 8-4 | 60 | 30 | 10 | 1400 |
| 8-5 | 50 | 30 | 20 | 1400 |
| 8-6 | 45 | 50 | 5 | 1350 |
| 8-7 | 35 | 60 | 5 | 1300 |
| Comparative Example |  |  |  |  |
| 8 | 98 | 0 | 2 | 1450 |

TABLE 14

|  | Friction coefficient | Comparative wear amount ($\times 10^{-8}$ mm$^2$/N) | Particle diameter (nm) |
|---|---|---|---|
| Example |  |  |  |
| 8-1 | 0.2 | 1.0 | 60 |
| 8-2 | 0.2 | 1.0 | 60 |
| 8-3 | 0.2 | 1.5 | 60 |
| 8-4 | 0.1 | 0.3 | 50 |
| 8-5 | 0.1 | 0.5 | 50 |
| 8-6 | 0.15 | 0.7 | 30 |
| 8-7 | 0.2 | 0.8 | 30 |
| Comparative Example |  |  |  |
| 8 | 0.6 | 3 | 500 |

INDUSTRIAL APPLICABILITY

According to the present invention, the silicon nitride-based composite sintered body having excellent mechanical strength from room temperature to a medium-low temperature range (up to 300° C.), a low friction coefficient and excellent wear resistance can be provided; and a raw material powder for the sintered body can be also provided. The sintered body of the present invention is useful as various mechanical parts, cutting tools and sliding parts. The raw material powder has a structure in which fine dispersed particles having a metal nitride as a principal component thereof are dispersed in a fine matrix having Si$_3$N$_4$ as a principal component thereof. Consequently, the silicon nitride-based composite sintered body having excellent properties can be obtained easily. Moreover, in the producing method of the present invention, by suitably devising the method of mixing and pulverizing, a specific silicon nitride-based composite powder comprising secondary composite particles can easily be manufactured as the raw material powder. Furthermore, by sintering under specified conditions using this composite powder, grain growth during the sintering can be suppressed, and hence the silicon nitride-based composite sintered body having excellent properties as described above can be obtained.

The invention claimed is:

1. A silicon nitride-based composite sintered body, comprising silicon nitride, titanium compounds and boron nitride, wherein each of said silicon nitride, titanium compounds and boron-nitride has a mean particle diameter of 100 nm or less and a friction coefficient under a lubricant-free condition of 0.3 or less.

2. A silicon nitride-based composite sintered body according to claim 1, wherein said titanium compounds are titanium nitride and titanium boride.

3. A silicon nitride-based composite sintered body according to claim 2, wherein said titanium boride is columnar or planar and dispersed at a grain boundary of the silicon nitride and the titanium nitride and inside the titanium nitride particle, and said boron nitride has a size of 50 nm or less and is dispersed at a grain boundary and a triple point of the silicon nitride and the titanium compounds.

4. A silicon nitride-based composite sintered body according to claim 3, wherein a part of said titanium boride is planar or columnar with a minor axis diameter of 20 nm or less and an aspect ratio of 3 or more.

* * * * *

UNITED STATES PATENT AND TRADEMARK OFFICE
CERTIFICATE OF CORRECTION

| | | |
|---|---|---|
| PATENT NO. | : 7,008,893 B2 | Page 1 of 1 |
| APPLICATION NO. | : 11/031994 | |
| DATED | : March 7, 2006 | |
| INVENTOR(S) | : Masasahi Yoshimura | |

It is certified that error appears in the above-identified patent and that said Letters Patent is hereby corrected as shown below:

On the title page Item (62)

"Related U.S. Application Data", change "Division of application No. 10/311,604, filed as application No. PCT/JP02/03864 on Apr. 18, 2002, now Pat. No. 6,844,282." to -- Division of application No. 10/311,604, filed December 18, 2002, now Pat. No. 6,844,282, which is a 371 of PCT/JP02/03864 on April 18, 2002 --

Signed and Sealed this

Twenty-fourth Day of April, 2007

JON W. DUDAS
*Director of the United States Patent and Trademark Office*